United States Patent Office

2,746,866
Patented May 22, 1956

2,746,866

INHIBITION OF CAKING OF SOLUBLE COFFEE AND THE INHIBITED PRODUCT

Samuel Lee, Fair Lawn, N. J., assignor, by mesne assignments, to American Home Products Corporation, New York, N. Y., a corporation of Delaware No Drawing. Application November 12, 1954, Serial No. 468,557

5 Claims. (Cl. 99—71)

This invention relates to a method of inhibition of caking of soluble coffee and to the inhibited product. More particularly it relates to the inhibition of caking of finely divided solid soluble coffee extract by blending with it solid finely divided calcium gluconate, with or without the addition of a small amount of lactose, and to the composition so produced.

Solid soluble coffee, so called "instant coffee" is a highly hygroscopic powder. If the coffee is kept in a securely closed container and is measured out with a dry spoon, this property offers comparatively little difficulty. However if these precautions are not observed, the coffee rapidly picks up moisture; the fine particles cake together at first, losing their free-flowing character, and then, if exposure to moisture is extended, agglomerate to a semi-liquid tarry mass. This is a particularly serious drawback in coffee vending machines where the coffee powder may be exposed to the vapors of the hot water used in preparing each cup, and yet where maintenance of the free-flowing character of the coffee powder is essential to the proper operation of the machine.

Accordingly it is an object of this invention to provide a method of inhibiting the caking of finely divided solid soluble coffee on exposure to the moisture of the atmosphere and to provide such a method that is free of any deleterious effect on taste or alimentation.

I have discovered that the addition to and distribution in the coffee powder of a minor amount of calcium gluconate has the desired effect. Surprisingly, also, I have discovered that calcium gluconate is unique among the considerable number of substances I have tested in having the combination of properties required for this use.

The chief requirements for a coffee additive of this kind are the following:

1. It must impart no perceptible taste to the coffee.
2. It must be non-deleterious when ingested.
3. It must be a physiological material, i. e. it must not introduce foreign compounds or ions into the body when ingested.
4. It must be relatively insoluble in water at ordinary temperatures but must dissolve readily in hot water.
5. It must have the property when mixed with coffee powder of preventing caking on exposure to moist air.

The use of additives to protect food against deterioration due to moisture is an old and well known procedure. More specifically, prior attempts have been made to stabilize instant coffee against caking by the use of additives. Reichart in U. S. Patent 758,384 discloses the use of "one-half to five percent of saccharate of lime," and Aeckerle in U. S. Patent 2,238,149 discloses mixing 10 g. dehydrated finely ground calcium citrate with 90 g. ground coffee powder.

I have carried out extensive tests on these two additives and on numerous other promising additives officially described as "tasteless" in the U. S. Pharmacopoeia. While many of them, including calcium saccharate and calcium citrate exert a beneficial protective effect as far as moisture deterioration goes, none of them with the exception of calcium gluconate, produces a potable coffee. With this exception, every compound that had protective value was perceptible by the drinker as an unpleasant-tasting foreign substance in beverage coffee made from the test mixture.

The results may be tabulated as follows:

TABLE I

| Additive | Perceptible foreign taste |
|---|---|
| calcium saccharate | alkaline, lime-water-like, briny, "chemical." |
| calcium citrate | |
| calcium phosphate, di- and tri- | |
| calcium carbonate | |
| magnesium trisilicate | chalky, "chemical." |
| barium sulfate | |
| aluminum hydroxide | |
| calcium gluconate | none. |

The reasons for the uniqueness of calcium gluconate are not altogether understood but probably rest on the following combination of factors: What taste it has (even so-called "tasteless" compounds usually have some detectable taste in a minor degree (blends with the natural coffee taste so as to be undetectable in the amounts used; it is physiologically acceptable; its solubility in water has a high temperature coefficient so that, while difficultly soluble at ordinary temperatures, it is rapidly soluble at beverage coffee temperatures, say 150° F. and up, and accordingly leaves no unpleasant unattractive white sediment in the cup as do most "insoluble" calcium salts; it occurs and is used in this invention as a stable monohydrate

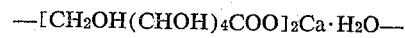
—[CH₂OH(CHOH)₄COO]₂Ca·H₂O— the aqueous vapor tension of which appears to stabilize the gaseous envelope around each coffee particle, thus inhibiting caking. Anhydrous calcium gluconate can also be used, but is ordinarily not available commercially.

According to my invention, I mix calcium gluconate, preferably as the monohydrate, in a finely pulverized state with powdered soluble coffee in an amount varying from 1 to 20 percent, preferably 1 to 10 percent, of the weight of the coffee. The coffee may optionally contain an added carbohydrate such as lactose or dextrose. The mixture is then packaged. The mixing preferably takes place promptly after the drying and cooling steps in the manufacture of the soluble coffee, but at any rate before the product has been exposed to moisture.

The following examples describe embodiments of my invention, but they are to be taken as illustrative only and not as limiting the scope of my invention, which is defined in the appended claims.

*Example 1*

Ten lb. U. S. P. calcium gluconate monohydrate is ground to pass a 325 mesh sieve and thoroughly mixed in a ribbon mixer with 490 lb. freshly dried and cooled pure soluble coffee powder. After a brief period of bulk storage, the mixture is packaged. It contains approximately 2% calcium gluconate monohydrate based on the coffee.

*Example 2*

The same procedure is followed as in Example 1 except that the 490 lb. coffee powder is replaced by 490 lb. of a mixture of 80% pure coffee powder and 20% commercial edible lactose. The final mixture contains approximately 2.6% calcium gluconate monohydrate based on the pure coffee.

*Example 3*

Mixtures of the compositions indicated in Table II were held at room temperature and 100% relative humidity until caking occurred. They were examined at frequent intervals to determine the presence of caking. The third column of the table indicates the time at which onset of caking was observed under these rigorous accelerated conditions.

TABLE II

TIME OF ONSET OF CAKING AT ROOM TEMPERATURE AND 100% RELATIVE HUMIDITY

| Percent calcium gluconate monohydrate, based on pure coffee | Pure soluble coffee powder | 80% pure coffee powder, 20% α-lactose monohydrate |
|---|---|---|
| | Hours | Hours |
| 0 | 1 | 3 |
| 1 | 5 | 6 |
| 3 | 7 | 8 |
| 5 | 9 | 10 |
| 10 | 18 | 18 |
| 20 | 24 | 24 |

From practical experience, a period of 18 hours to the onset of caking under the conditions of the test—i. e. the maintenance of the free-flowing characteristic for a time just short of 18 hours—is considered to indicate a commercially satisfactory product under average conditions met with in the Temperate Zone. Under humid tropical conditions, the maximum amount of calcium gluconate monohydrate is indicated.

I claim:

1. The method of inhibiting caking of powdered solid soluble coffee extract on exposure to moist air which comprises mixing with the coffee extract a minor amount of finely divided calcium gluconate.

2. The method of inhibiting caking of powdered solid soluble coffee extract on exposure to moist air which comprises mixing with the coffee extract a minor amount of lactose and a minor amount of finely divided calcium gluconate.

3. The method of inhibiting caking of powdered solid soluble coffee extract on exposure to moist air which comprises mixing with the coffee extract an amount of finely divided calcium gluconate monohydrate in the range 1–20 percent of the weight of coffee extract.

4. The method of inhibiting caking of powdered solid soluble coffee extract on exposure to moist air which comprises mixing with the coffee extract up to 25 percent lactose and an amount of finely divided calcium gluconate monohydrate in the range 1–20 percent based on the weight of coffee extract.

5. Solid soluble coffee extract in powdered form containing admixed therewith an amount of finely divided calcium gluconate in the range 1–20 percent based on the weight of coffee extract.

References Cited in the file of this patent

UNITED STATES PATENTS

| 758,384 | Reichert | Apr. 26, 1904 |
| 2,333,027 | Morganthaler | Oct. 23, 1943 |
| 2,564,332 | Kellogg | Aug. 14, 1951 |

FOREIGN PATENTS

| 575,118 | Great Britain | Feb. 4, 1946 |

OTHER REFERENCES

"Condensed Chemical Dictionary," 3rd edition, Reinhold Publishing Co., page 15s.